United States Patent [19]

Kaneko et al.

[11] 4,078,240

[45] Mar. 7, 1978

[54] PHOTOGRAPHIC FLASH DEVICE

[75] Inventors: Yoshikazu Kaneko, Shijonawate; Hisashi Ogura, Ikoma, both of Japan

[73] Assignee: West Electric Company, Ltd., Osaka, Japan

[21] Appl. No.: 710,927

[22] Filed: Aug. 2, 1976

[30] Foreign Application Priority Data

Aug. 19, 1975 Japan .............................. 50-100853

[51] Int. Cl.² ...................... G03B 7/16; G03B 15/02; H05B 41/14
[52] U.S. Cl. ........................................ 354/33; 362/4; 315/241 P; 354/126; 354/145
[58] Field of Search ..................... 354/27, 32, 33, 35, 354/60 F, 126, 127, 128, 145, 149, 23 R, 137, 138, 139, 146, 59; 240/1.3; 315/241 P

[56] References Cited

U.S. PATENT DOCUMENTS

| 3,681,649 | 8/1972 | Uno et al. | 354/145 |
| 3,779,142 | 12/1973 | Yata et al. | 354/24 |
| 3,869,604 | 3/1975 | Prochnow | 240/1.3 |
| 3,882,514 | 5/1975 | Graham | 354/149 |
| 3,967,106 | 6/1976 | Chen | 240/1.3 |

Primary Examiner—L. T. Hix
Assistant Examiner—William B. Perkey
Attorney, Agent, or Firm—Cushman, Darby & Cushman

[57] ABSTRACT

An automatic photographic flash device wherein the amount of light of the flash tube is automatically controlled in response to intensity of light from the direction of the photographic object by means of an electric circuit A flash tube part is movably installed on a main case part containing a battery and the circuit A switch is installed in the device in such a manner that when the flash tube part is moved to a position not directed at the photographic object, the switch causes the circuit to appropriately increase the amount of light discharged by the flash tube when it is actuated.

5 Claims, 9 Drawing Figures

PHOTOGRAPHIC FLASH DEVICE

BACKGROUND OF THE INVENTION

This invention relates to an automatic exposure controlling type electronic photographic flash device capable of bounce flashing with satisfactory results by providing automatic light amount controlling means.

Recently, electronic photographic flash devices, i.e. strobo-flash devices have become widely used in photography for lighting the photographic object. In such automatic electronic flash devices, the lighting time of the strobo tube is automatically responsive, responding to the light reflected by the photographic object, by a controlling circuit having a photoelectric element which is directed at the photographic object to receives light reflected therefrom. With such conventional automatic type strobo flash devices, in order to control strobo tube current fed from an energy storing capacitor to the strobo tube, a switching device, for instance, a small gas discharge tube with a triggering electrode or a semiconductor switching device (thyristor), is used. The switching device stops the current of the strobo tube at a time dependent on the intensity of the reflected light. U.S. Pat. No. 3,869,642 granted Mar. 4, 1975 to Mekmet Sabanci and U.S. Pat. No. 3,779,142 which was granted to Kataro Yata Dec. 18, 1973 disclose such prior art arrangements.

Though the above-mentioned automatic type strobo flash devices have automatic light amount controlling means, in the case of bounce flash photography, wherein light from the flash is directed not to the photographic object but to a wall or ceiling, such devices are liable to cause underexposure. More particularly, when, as shown in FIG. 1, the flash light is bounced from a wall or ceiling W of, for instance, white or reflective color, the longer wavelength part or a part close to the infrared light of the flashed light is strongly reflected toward the photographic object 0. However, a considerable part of shorter wavelength or a bluish part of the flash light is scattered in all directions and therefore is not efficiently reflected toward the photographic object. As a result, the photographic object is illuminated by light which is more reddish than the original flashed light. The photoelectric element P generally used for receiving reflected light from a photographic object to measure the intensity thereof, is a photodiode or phototransistor. Such photoelectric elements have their sensitivity peak at longer wavelengths. Moreover, ordinary photographic film has a sensitivity spectrum similar to that of human eyes and has substantially no sensitivity in the infrared range. Accordingly, in the case of bounce flashing, the photoelectric element P of such conventional flash devices produces sufficient electric output, but the film of the camera receives less light then with ordinary flashing. Therefore, the picture thus take is underexposed.

Next, as shown in FIG. 2, when the bounced light illuminates a wall W' which is behind the photographic object, in addition to the reason described referring to FIG. 1, the light reflected by the back wall, W', over the area covered by the solid incident angle $\theta$ to the photoelectric element P, also strikes the photoelectric element P. Accordingly, the flash device stops its flash even faster than in the case of FIG. 1, and hence the resultant picture is further underexposed. When other reflective things exist behind or to the side of the photographic object, the degree of the underexposure becomes still greater.

Several devices have been made to rotate a reflector associted with the flash tube or to move slide-in shoe of the flash unit case in order to direct flash light toward a ceiling or a wall for bounce flashing. (for instance, U.S. Pat. No. 3,869,604, issued on Mar. 4, 1975 Prochnow to Claus). However such devices have required complex rotating parts in the case, and hence have increased the size of the case. Such increased case size is not desirable in a miniaturized flash device.

SUMMARY OF THE INVENTION

The present invention provides automatic type flash devices capable of bounce flashing without underexposure while avoiding unnecessary in crease of size.

More particularly, the present invention concerns an automatic type strobo flash device having means for changing the direction of the flash light beam and means for automatically and simultaneously controlling the beam operating circuit to compensate for the direction changes of the flash light beam.

DETAILED DISCLOSURE OF THE INVENTION

Figure 1:
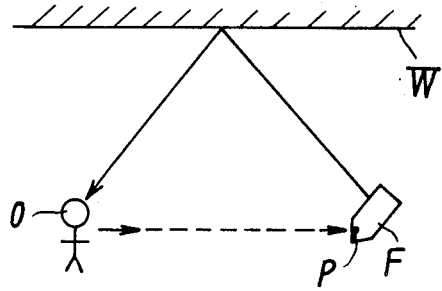
FIG. 1 illustrates the principle of the bounce photography
Figure 2:
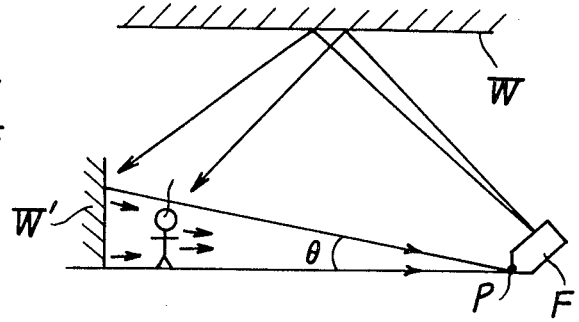
FIG. 2 illustrates another example the bounce photography.
Figure 3:
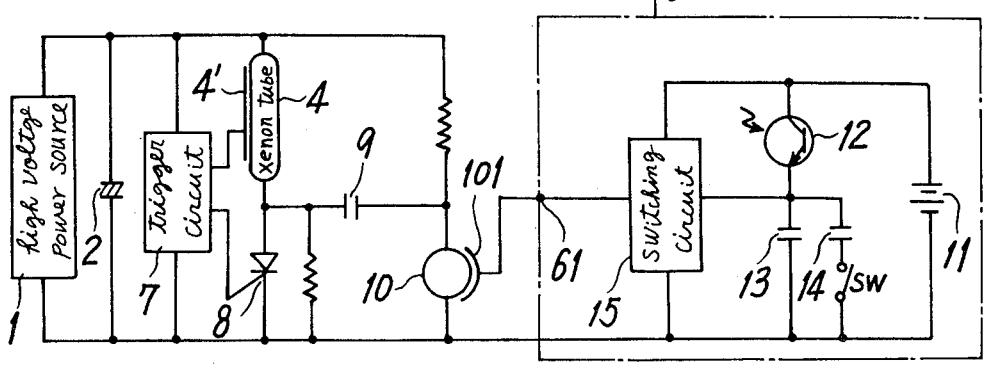
FIG. 3 is a block diagram of one example of a control circuit according to the present invention.

In FIG. 3, which is a block diagram of one example of the present invention, a strobo flash tube 4 is connected in series with a thyristor 8 across the output terminals of a high voltage D.C. power source 1 and both ends of an energy storing capacitor 2. The triggering electrode 4' of the flash tube and the gate electrode of the thyristor 8 are connected to a trigger circuit 7. A turn-over capacitor 9 and a switching element 10 are connected in series across the and cathode of the thyristor 8 so as to impress a reverse voltage on the thyristor for turning the thyristor 8 off upon switching on of the switching element 10. The triggering electrode 101 of the switching element 10 is connected to the output terminal of control circuit 6. In the control circuit 6, a phototransistor 12 and a main timing capacitor 13 are connected in series across a low voltage D.C. power source 11, and an auxiliary timing capacitor 14 is connected in series with an automatic switch SW across the main timing capacitor 13. An input terminal of the switching circuit 15 is connected to the main and auxiliary capacitors 13 & 14, so that the switching circuit 15 produces an output signal at the output terminal 61 when the capacitor voltage reaches a preset level. The automatic switch SW is designed so as to be closed to connect the auxiliary capacitor 14 in parallel with the main capacitor 13 when the flash tube is turned to a bounce flash position.

Therefore, in this position, the time constant of the circuit is extended by connection of the capacitor 14 with the main timing capacitor 13, thereby extending the flash period and increasing the light amount produced by the flash.

Figure 4:
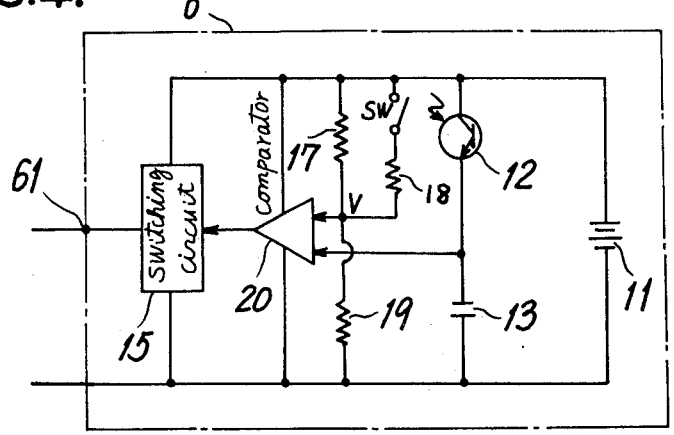
FIG. 4 is a block diagram of another example of a control circuit according to the present invention.
Figure 5:
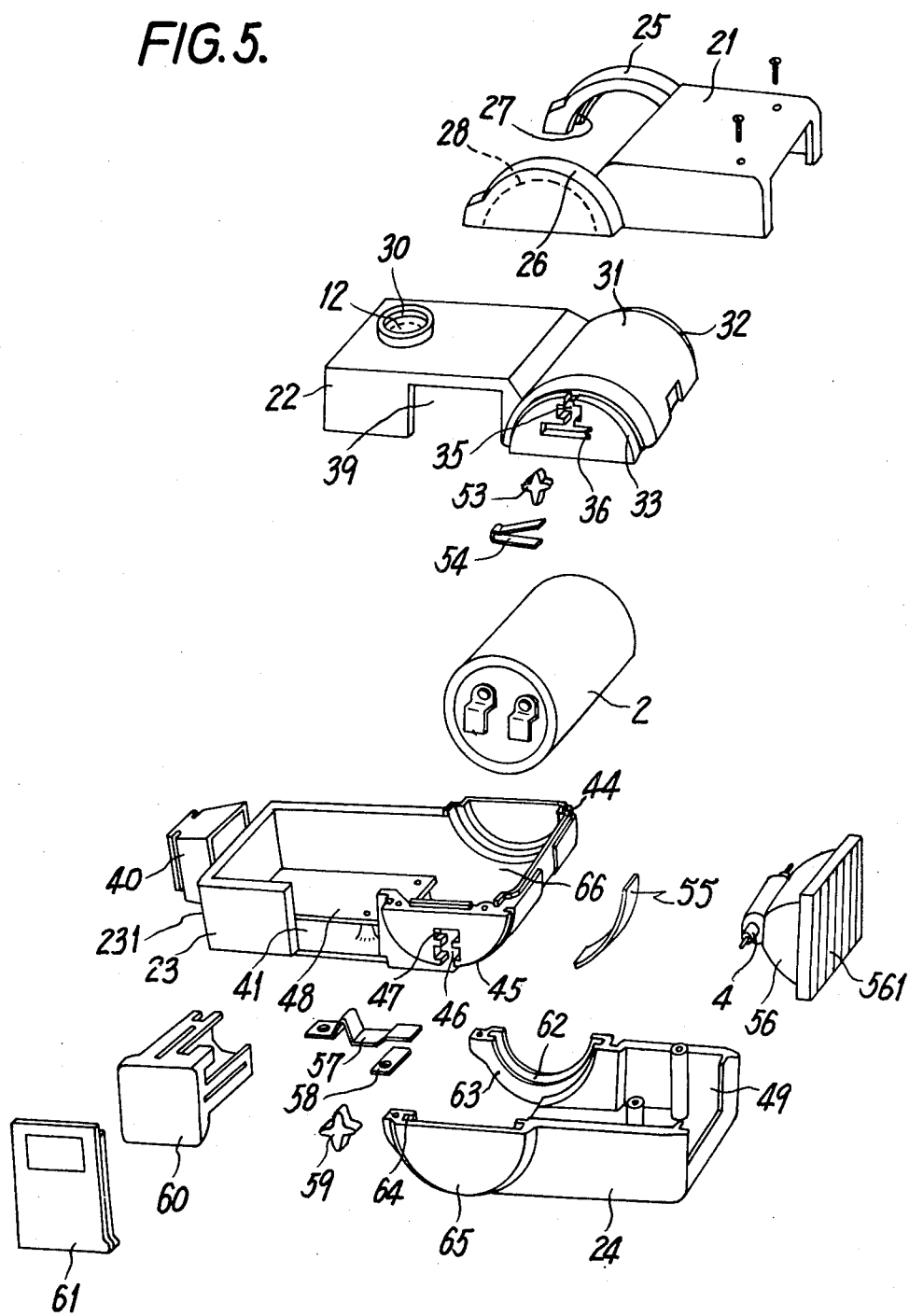
FIG. 5 is exploded perspective view of a photographic flash device according to the present invention.

FIG. 4 shows another example of a control circuit 6 which can be employed in place of the control circuit shown in the example of FIG. 3. In FIG. 4 a timing capacitor 13 is connected in series with a phototransistor 12 across a low voltage D.C. power source 11. The timing capacitor 13 also is connected to one input terminal of a comparator 20, the other input terminal of which is connected to the voltage dividing point V of a voltage dividing network, i.e. a reference voltage circuit comprising resistors 17 and 19. An auxiliary resistor 18 and an automatic switch SW are connected in series across both ends of the resistor 17. The automatic switch SW is designed so as to be closed to connect the auxiliary resistor 18 in parallel with the resistor 17 when the flash tube is turned to a bounce flash position. An output terminal of the comparator 20 is connected to the input terminal of a switching circuit 15, so that the switching circuit 15 produces an output signal at the output terminal 61 when the capacitor voltage reaches a preset level. As a result of this construction, in the bounce flash position of the flash tube, the switching level is made higher by the connection of the resistor 18 to the voltage dividing resistor 17, thereby delaying production of the output by the comparator 20 so as to extend the flashing period and increase the amount of light generated.

FIGS. 5 to 9 show mechanical structure incorporating the arrangement described with respect to show a foregoing FIGS. 3 and 4.

Upper half case 22 and lower half case 23 are assembled to form the main part B and the energy storing capacitor 2 is installed in the cylindrical space 66 of the main part B. A printed circuit substrate 48 bearing small electronic parts (not shown) on the underside thereof is disposed in the main part B. A battery container 60 is inserted in the main part B through an opening 39-41, and a cover 61 is provided to close the opening 39-41. A slide-in shoe 40 for fitting the flash device to a camera is provided on the bottom face 231 of the main part B.

Figure 6:
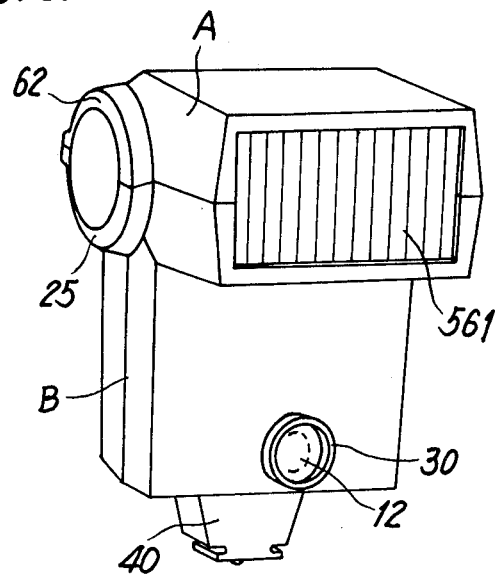
FIGS. 6 and 7 are front and rear perspective views of a photographic flash device according to the present invention.
Figure 7:
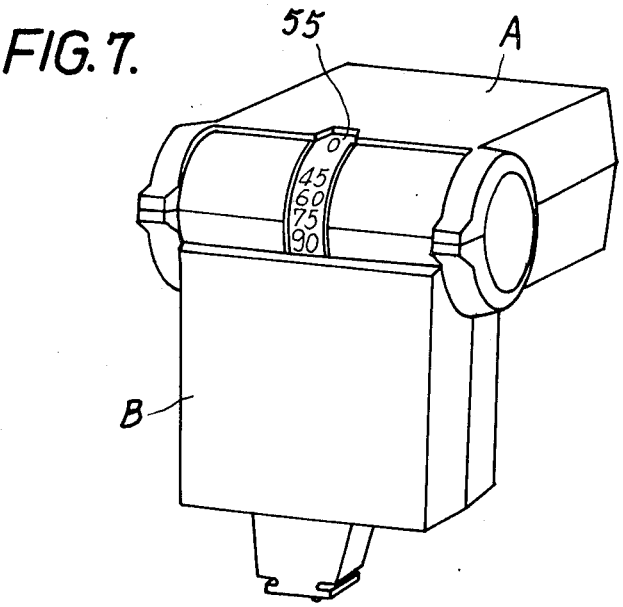

Upper half case 21 and lower half case 24 are assembled to form a flash tube part A, and the flash tube 4 i.e., a xenon gas discharge tube, a reflector 56 and a Fresnel lens 561 are installed in an opening on the top part of the flash tube part A. Upper semi-circular parts 25 & 26 and lower semi-circular parts 63 & 65 form a pair of circular covers 25-63 & 26-65, grooves 27-62 & 28-64 of which rotatably fit on circular edges 32-44 and 33-45 of part B, thereby forming a rotatable or hinge part. One of the circular side faces of the main part B has a hollow 35 for a pin 53, a hollow 36 for a spring 54, a hollow 46 for another pin 59 and a hollow 47 for a moving contact plate 57 of the switch SW. The pins 53 and 59, the spring 54 and the moving contact plate 57 are held by the circular cover 26-65. In a light receiving window 30, the phototransistor 12 is disposed. On the outer face of the cylindrical part of the main part B, an angle indicating plate 55 is bonded. The flash device assembled in the case arrangement just described is shown by FIGS. 6 and 7.

Figure 8:
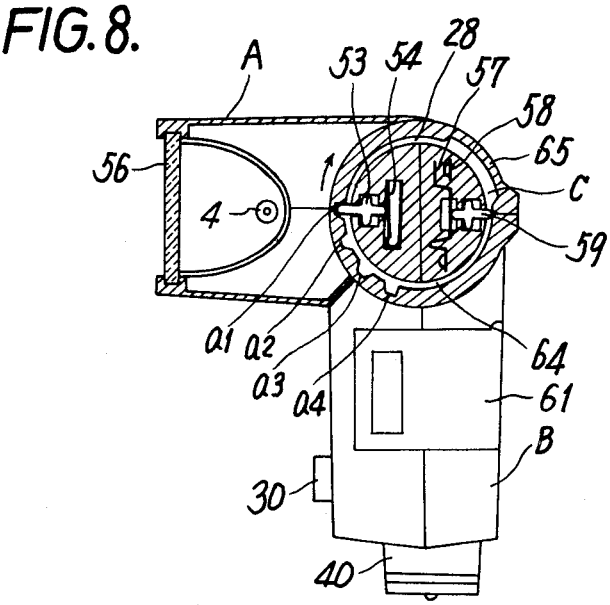
FIGS. 8 and 9 are side views, partially in section, showing automatic switch of a photographic flash device according to the present invention.
Figure 9:
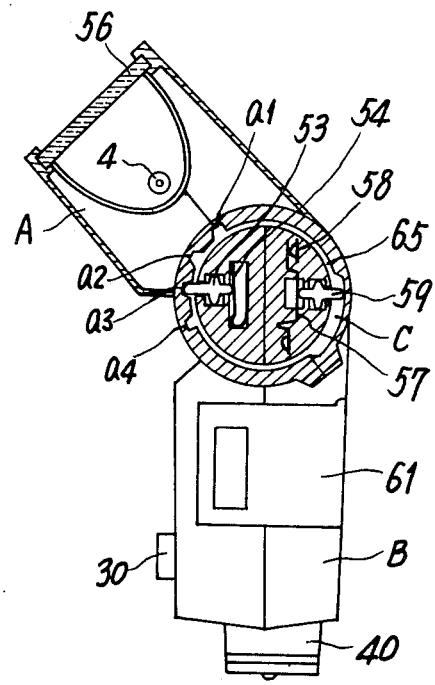

As illustrated in FIGS. 8 and 9, on the rear side of the circular cover 28-64 and inside the circular groove 28-65, several notches $a1$, $a2$, $a3$ and $a4$ are provided for receiving the pin 53, which is urged by the spring 54 towards notches, and a long recess c for receiving the pin 59 of the switch SW also is provided.

With such a flash device, the pin 53 pushed into selected ones of the notches $a1$ to $a4$ gives click-stop action.

When the flash tube part A is in its direct flash position as shown by FIG. 8, the pin 59 is pushed to maintain contact plate 57 separated from the fixed contact plate 58 opening the switch SW. Therefore, as described with reference to FIGS. 3 and 4, the control circuit 6 is kept in its normal state.

However, when the flash tube part A is tilted to one of the bounce flash positions as shown by FIG. 9, the pin 59 is received in the long recess c thereby allowing the contacts 57 and 58 to touch each other closing the switch SW. Therefore, as described with reference to FIGS. 3 and 4, the control circuit 6 is switched to compensate for the altered position of part A by extending the lighting period of the flash.

In the photographic flash device of the present invention, since the automatic switch SW is linked to the means for adjusting the angle between the main part B and the flash tube part A, the compensation extending the lighting period for bounce flashing is automatically made without any requirement for manual handling of a dial or a switch. Furthermore, since the bulky energy storing capacitor 2 is installed in the cylindrically-shaped space 66 of part B about which part A rotates, the main part B and the flash tube part A can be made compact thereby enabling miniaturization of the whole device. Furthermore, by means the click-stop action during rotation of the flash tube part A with respect to main part B, the user of the invention can select a desired angle even in a dark place without observing the angle indicator 55.

What is claimed is:

1. In an automatic type photoelectric flash device which includes:
   a strobo flash tube retained in a flash tube part rotatably installed on a main part,
   a capacitor connected to said flash tube, said capacitor being adapted to store electrical energy and to supply current for flashing said tube,
   a battery for charging said capacitor,
   a flash-terminating circuit operatively associated with said flash tube, and
   an electric circuit joined to said flash-terminating circuit for controlling same, said circuit comprising light-receiving means for producing an output in response to light reflected from the direction of a photographic object and switching means responsive to said output reaching a preset level for producing a flash-terminating signal which is applied to the flash-terminating circuit, the improvement comprising:
   additional switch means operatively related to said flash tube part and to said electric circuit, said additional switch means actuated in response to the position of said tube part relative to the main part for altering a circuit constant of said electric circuit thereby changing the time required for said electric circuit to produce a flash-terminating signal.

2. A photographic flash device as set forth in claim 1, wherein said electric circuit includes a first additional capacitor connected in series with the light-receiving means and a second additional capacitor operatively related to said additional switch means and selectively joined to said first additional capacitor in accordance with the actuation of the additional switch means.

3. A photographic flash device as set forth in claim 1, wherein said electric circuit includes: an additional capacitor connected in series with the light-receiving means, reference voltage generating means, and a comparator for comparing voltage stored by said additional capacitor with said reference voltage for producing said flash-terminating signal; and wherein said electric circuit further includes: a resistor operatively related to said additional switch means, said resistor being selectively joined to said reference voltage generating means to vary the reference voltage in accordance with the actuation of the additional switch means.

4. A photographic flash device as set forth in claim 1, wherein said energy-storing capacitor is installed in said rotating part.

5. A photographic flash device as set forth in claim 1, wherein said rotating part includes a click-stop means for defining several preset angles in said rotation.

* * * * *